United States Patent
Ueyama et al.

(10) Patent No.: US 12,306,596 B2
(45) Date of Patent: May 20, 2025

(54) ADDITIONAL LEARNING DEVICE, ADDITIONAL LEARNING METHOD, AND STORAGE MEDIUM

(71) Applicant: OMRON Corporation, Kyoto (JP)

(72) Inventors: Yuki Ueyama, Kyoto (JP); Yoshiki Ito, Kizugawa (JP); Yasuaki Abe, Takatsuki (JP); Shuji Inamoto, Nara (JP); Nobuyuki Sakatani, Otsu (JP)

(73) Assignee: OMRON Corporation, Kyoto (JP)

( * ) Notice: Subject to any disclaimer, the term of this patent is extended or adjusted under 35 U.S.C. 154(b) by 834 days.

(21) Appl. No.: 17/068,829

(22) Filed: Oct. 13, 2020

(65) Prior Publication Data

US 2021/0157285 A1 May 27, 2021

(30) Foreign Application Priority Data

Nov. 21, 2019 (JP) .................................. 2019-210657

(51) Int. Cl.
  *G06N 20/00* (2019.01)
  *G05B 13/02* (2006.01)
(52) U.S. Cl.
  CPC ........... *G05B 13/028* (2013.01); *G06N 20/00* (2019.01)
(58) Field of Classification Search
  CPC ................ G05B 13/028; G05B 19/054; G05B 2219/1105; G06N 20/00; G06N 5/00; G06N 5/022; G06N 5/025
  See application file for complete search history.

(56) References Cited

U.S. PATENT DOCUMENTS 7,308,322 B1 * 12/2007 Discenzo ........... G05B 23/0221
                                                                  702/182
2012/0263376 A1    10/2012 Wang et al.
(Continued)

FOREIGN PATENT DOCUMENTS

| CN | 102298729 | 12/2011 |
| CN | 108805292 | 11/2018 |

(Continued)

OTHER PUBLICATIONS

"Search Report of Europe Counterpart Application", issued on May 6, 2021, pp. 1-11.
(Continued)

*Primary Examiner* — Paulinho E Smith
(74) *Attorney, Agent, or Firm* — JCIPRNET (57) ABSTRACT

The disclosure provides an additional learning device, an additional learning method, and a storage medium. The additional learning device includes: an acquisition unit acquires information based on data observed in a control object which is controlled by an instruction in accordance with an output from a previously learned model outputting an objective variable with respect to an explanatory variable. A determination unit determines whether or not the explanatory variable corresponding to the information acquired by the acquisition unit exists as learning data of the model, that is, whether or not the explanatory variable is unknown. When the explanatory variable is determined to be unknown by the determination unit, an additional learning unit acquires the objective variable corresponding to the unknown explanatory variable, correlates the unknown explanatory variable and the acquired objective variable, and additionally learns the model. The model is updated with regard to unknown disturbance events without requiring manpower.

4 Claims, 5 Drawing Sheets

(56) References Cited

U.S. PATENT DOCUMENTS

| | | | |
|---|---|---|---|
| 2017/0291301 A1 | 10/2017 | Ibarz Gabardos et al. | |
| 2018/0012128 A1* | 1/2018 | Chiba | G06N 5/045 |
| 2018/0114101 A1 | 4/2018 | Desai et al. | |
| 2018/0114334 A1* | 4/2018 | Desai | G06V 10/82 |
| 2018/0322365 A1 | 11/2018 | Yehezkel Rohekar | |
| 2019/0032512 A1* | 1/2019 | Schmit | G06N 20/00 |
| 2019/0093187 A1* | 3/2019 | Lee | G06N 3/08 |
| 2019/0212749 A1 | 7/2019 | Chen et al. | |
| 2023/0075229 A1* | 3/2023 | Abe | G05B 19/4065 |

FOREIGN PATENT DOCUMENTS

| | | |
|---|---|---|
| CN | 108898218 | 11/2018 |
| CN | 108921301 | 11/2018 |
| CN | 110263697 | 9/2019 |
| CN | 110268350 | 9/2019 |
| JP | 2010191556 | 9/2010 |
| JP | 2013025367 | 2/2013 |
| JP | 2014096058 | 5/2014 |
| JP | 2017227174 | 12/2017 |
| JP | 2018077823 | 5/2018 |
| JP | 2018119924 | 8/2018 |
| JP | 2018206061 | 12/2018 |
| JP | 2019028765 | 2/2019 |
| JP | 2019079275 | 5/2019 |
| JP | 2019185422 | 10/2019 |
| WO | 2019180466 | 9/2019 |

OTHER PUBLICATIONS

"Office Action of Japan Counterpart Application", issued on Aug. 1, 2023, with English translation thereof, p. 1-p. 6.

"Office Action of China Counterpart Application", issued on Sep. 11, 2024, with English translation thereof, p. 1-p. 23.

* cited by examiner

ADDITIONAL LEARNING DEVICE, ADDITIONAL LEARNING METHOD, AND STORAGE MEDIUM

CROSS-REFERENCE TO RELATED APPLICATION

This application claims the priority benefit of Japan application serial no. 2019-210657, filed on Nov. 21, 2019. The entirety of the above-mentioned patent application is hereby incorporated by reference herein and made a part of this specification.

BACKGROUND

Technical Field

The disclosure relates to an additional learning device, an additional learning method, and a storage medium.

Related Art

For example, a manufacturing device that manufactures products aims to achieve operations such as a process and the like in the manner of reducing an influence of a material or an external environment change and meeting desired product quality standards. Therefore, a sensor that observes a necessary indicator or a controller that instructs an actuator to perform control operation is incorporated in the manufacturing device. The controller may have a data-driven function using a model which is machine learned.

Typically, designers try an implementation that meets the predetermined quality standards in consideration of the influence of a material or an external environment change that is expected at the design stage of the manufacturing device, but an occurrence of quality defects may be caused by an unexpected change (disturbance) after the manufacturing device is practically put into on-site operation. In addition, in many cases, measures are taken at the expense of production efficiency with the aim of reducing an incidence of these unexpected events.

As a technology which relates to the model included in a program that determines equipment operations such as measurement, control, or the like in the device described above, a diagnostic device is proposed, which appropriately holds information that is necessary for improving the performance of the model while suitably maintaining the diagnostic performance at all times. The diagnostic device includes a diagnostic part using a physical model, wherein the diagnostic part acquires diagnostic information from a machine tool, and uses a feature value which is predicted to be generated when an abnormality occurs based on physical features to perform diagnosis. In addition, the diagnostic device includes a diagnostic part using a mathematical model, wherein the diagnostic part uses a machine learning model that performs learning based on a normal signal and an abnormal signal to perform diagnosis. Besides, when diagnostic results obtained by the two diagnostic parts are different, the diagnostic device decides that it is necessary to update at least one of the physical model and the mathematical model, and sends a notification that the model needs to be updated (see Patent literature 1).

LITERATURE OF RELATED ART

Patent Literature

[Patent literature 1] Japanese Laid-open No. 2018-119924

SUMMARY

Problems to be Solved

However, in a technology described in Patent literature 1, the notification that the model needs to be updated is sent, but it is necessary for people to make a final update decision. In this case, for example, there is a problem that if a material change or an external environment change frequently occurs, a manual decision each time may be difficult.

The disclosure has been made in view of the above points and aims to update a model with regard to unknown disturbance events without requiring manpower.

Means to Solve Problems

In order to achieve the aim, an additional learning device according to the disclosure includes: an acquisition unit, which acquires information based on data observed in a control object that is controlled by an instruction in accordance with an output from a previously learned model outputting an objective variable with respect to an explanatory variable; a determination unit, which determines whether or not the explanatory variable corresponding to the information acquired by the acquisition unit is unknown in the model; and an additional learning unit, which acquires the objective variable corresponding to the explanatory variable, correlates the explanatory variable and the objective variable, and additionally learns the model when the explanatory variable is determined to be unknown by the determination unit.

In addition, after a predetermined time since the information corresponding to the unknown explanatory variable was acquired, the additional learning unit can acquire the information based on the data observed in the control object as the objective variable.

In addition, the additional learning unit can set a predetermined objective variable corresponding to the unknown explanatory variable, and acquire the predetermined objective variable as the objective variable corresponding to the unknown explanatory variable when the information, which is based on the data observed when the control object is controlled by the instruction in accordance with the output corresponding to a set objective variable, meets predetermined conditions.

In addition, the additional learning unit can acquire the objective variable corresponding to the unknown explanatory variable by an input from a user.

In addition, the determination unit can hold map information showing, in an explanatory variable space of the model, a region in which the explanatory variable exists as learning data when the model is learned and a region in which no explanatory variable exists as the learning data, and determine whether or not the explanatory variable corresponding to the information acquired by the acquisition unit is unknown based on which region the explanatory variable corresponding to the information acquired by the acquisition unit belongs to.

In addition, the additional learning device according to the disclosure can further include a control unit which generates and outputs a control signal for controlling the control object according to the objective variable output from the model.

In addition, the control object can be a manufacturing device.

In addition, an additional learning method according to the disclosure is a method in which an acquisition unit acquires information based on data observed in a control object that is controlled by an instruction in accordance with an output from a previously learned model outputting an objective variable with respect to an explanatory variable, a determination unit determines whether or not the explanatory variable corresponding to the information acquired by the acquisition unit is unknown in the model, and an additional learning unit acquires the objective variable corresponding to the explanatory variable, correlates the explanatory variable and the objective variable, and additionally learns the model when the explanatory variable is determined to be unknown by the determination unit.

In addition, a non-transitory computer readable storage medium, storing an additional learning program according to the disclosure for making a computer function as: an acquisition unit, which acquires information based on data observed in a control object that is controlled by an instruction in accordance with an output from a previously learned model outputting an objective variable with respect to an explanatory variable; a determination unit, which determines whether or not the explanatory variable corresponding to the information acquired by the acquisition unit is unknown in the model; and an additional learning unit, which acquires the objective variable corresponding to the explanatory variable, correlates the explanatory variable and the objective variable, and additionally learns the model when the explanatory variable is determined to be unknown by the determination unit.

Effect

According to the additional learning device, the additional learning method, and the storage medium of the disclosure, the model can be updated with regard to the unknown disturbance events without requiring manpower.

DESCRIPTION OF THE EMBODIMENTS

Hereinafter, an example of embodiments of the disclosure is described with reference to the drawings. In the embodiment, a programmable logic controller (PLC) equipped with an additional learning device according to the disclosure is described as an example. Moreover, the same or equivalent constituent elements and portions are denoted by the same reference signs in each drawing. In addition, a dimension and a proportion of the drawing are exaggerated for convenience of explanation, and may be different from the actual ratio.

Figure 1:
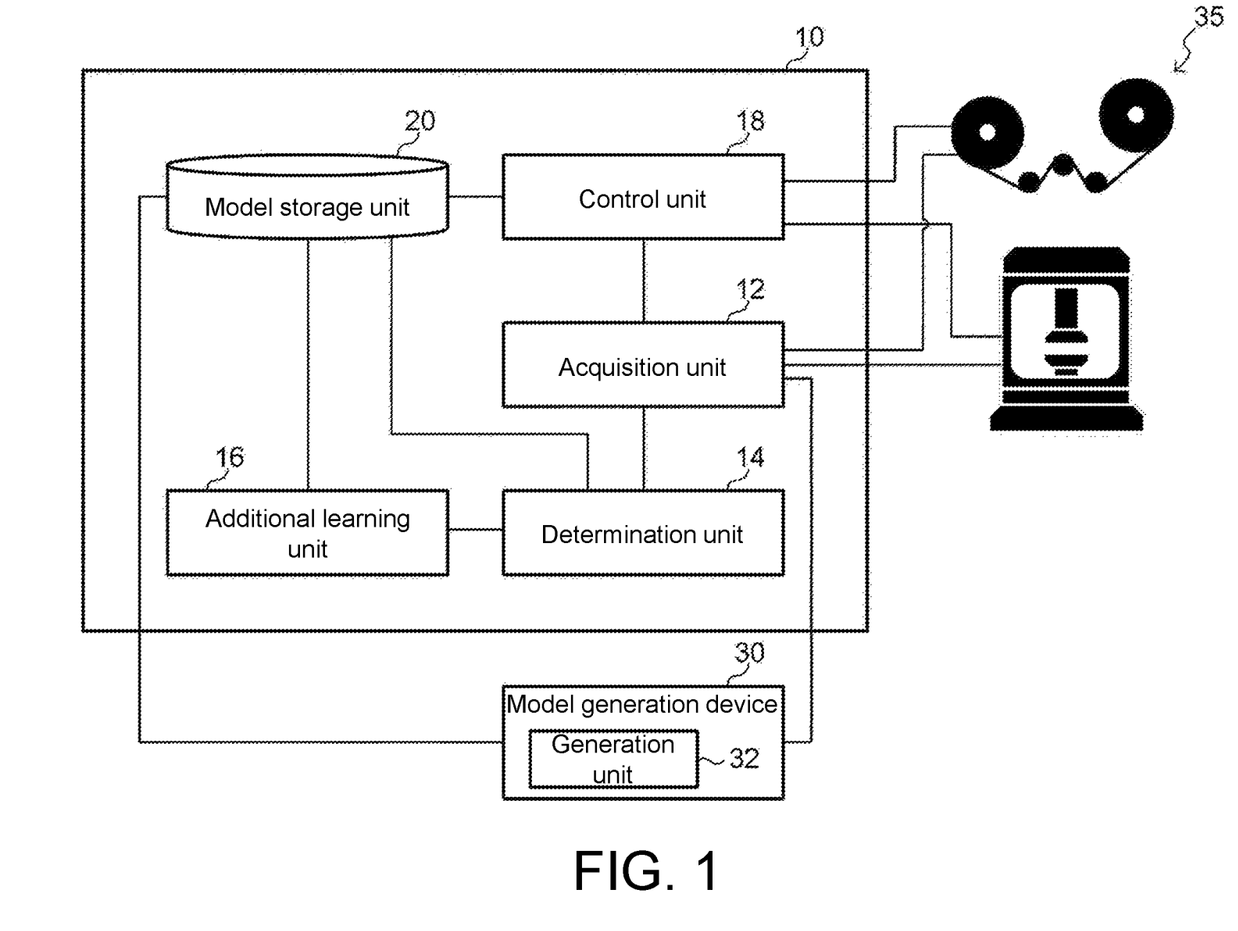
FIG. 1 is a block diagram showing function configurations of a PLC according to the embodiment.

As shown in FIG. 1, a PLC 10 according to the embodiment uses a model generated by a model generation device 30 to control operations of a manufacturing device 35 which is a control object. The manufacturing device 35 is, for example, a conveying device, a pressing machine, or the like. The manufacturing device 35 which is a control object may be one or more.

Figure 2:
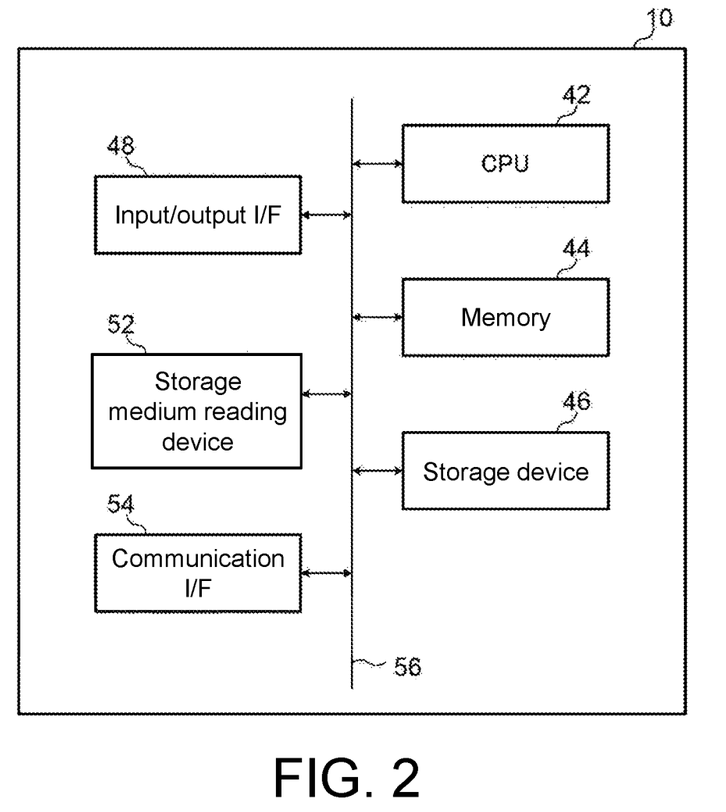
FIG. 2 is a block diagram showing hardware configurations of the PLC according to the embodiment.

FIG. 2 is a block diagram showing hardware configurations of the PLC 10 according to the embodiment. As shown in FIG. 2, the PLC 10 has a central processing unit (CPU) 42, a memory 44, a storage device 46, an input/output interface (I/F) 48, a storage medium reading device 52, and a communication I/F 54. The configurations are communicably connected to each other via a bus 56.

In the storage device 46, an additional learning program for executing control processing and additional learning processing described later is stored. The CPU 42 is a central calculation processing unit, and executes various programs or controls each configuration. That is, the CPU 42 reads the programs from the storage device 46, and uses the memory 44 as a work region to execute the programs. The CPU 42 performs control of each configuration described above and executes various calculation processing according to the programs stored in the storage device 46.

The memory 44 is configured by a random access memory (RAM), and is used as the work region to store programs and data temporarily. The storage device 46 is configured by a read only memory (ROM), a hard disk drive (HDD), a solid state drive (SSD), and the like, and stores various programs including an operating system and various data.

The input/output I/F 48 is an interface that performs an input of data from the manufacturing device 35 and an output of data to the manufacturing device 35. In addition, an input device such as a keyboard or a mouse for performing various inputs, and an output device such as a display or a printer for performing various information may be connected to the input/output I/F 48. By using a touch panel display as the output device, the output device may function as an input device.

The storage medium reading device 52 performs reading of data stored in various storage mediums such as a compact disc (CD)-ROM, a digital versatile disc (DVD)-ROM, a Blu-ray disc, and a universal serial bus (USB) memory, writing of data to the storage mediums, or the like.

The communication I/F 54 is an interface for communicating with other equipment and uses, for example, standards such as Ethernet (registered trademark), FDDI, and Wi-Fi (registered trademark).

Hardware configurations of the model generation device 30 are similar to the hardware configurations of the PLC 10, and thus the description thereof is omitted.

Next, a function configuration of the model generation device 30 is described. As shown in FIG. 1, the model generation device 30 functionally includes a generation unit 32.

The generation unit 32 generates a model by using learning data to previously learn parameters of the model, the model outputting an objective variable with respect to an explanatory variable and being used for controlling the manufacturing device 35 by the PLC 10.

In the embodiment, the explanatory variable is information based on data observed in the manufacturing device 35 (hereinafter referred to as "observation information"). The observation information is, for example, information such as a rotation speed of a motor in the manufacturing device 35, sensor values detected by various sensors arranged in the manufacturing device 35, a processing result obtained by executing determination processing or the like based on the values, and the like. The objective variable is a predicted value of a state of the manufacturing device 35 or the like which is inferred for the input explanatory variable. That is, the model infers the predicted value necessary to control the manufacturing device 35 based on the observation information.

Thus, the generation unit 32 generates a model by using a pair of the explanatory variable based on the observation information and the objective variable showing a correct state of the manufacturing device 35 when the observation information is observed as the learning data to learn the parameters of the model. The generation unit 32 stores the parameters of the learned model in a model storage unit 20 (described later in detail) of the PLC 10.

Figure 3:
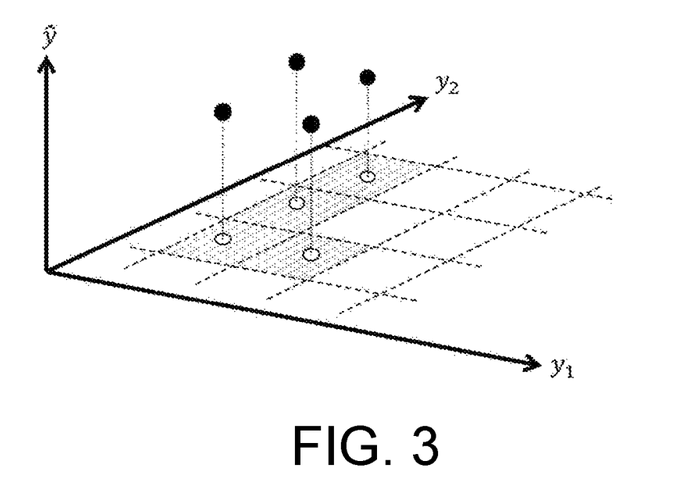
FIG. 3 is a diagram conceptually showing map information.

In addition, the generation unit 32 generates map information showing, in an explanatory variable space, a region in which the explanatory variable exists as the learning data used for learning of the model and a region in which no explanatory variable exists as the learning data. In FIG. 3, the map information is conceptually shown. In the example shown in FIG. 3, $y_1$ and $y_2$ are the explanatory variables, and $\hat{y}$ (in FIG. 3, "^ (hat)" is at the top of "y") is the objective variable. The explanatory variable space using each of $y_1$ and $y_2$ as each axis is, for example, divided into mesh-shaped small regions shown in FIG. 3. With regard to each of the learning data (black circles in FIG. 3) which is the pair of the explanatory variable and the correct objective variable, values showing that the explanatory variable exists are assigned to the small regions to which the explanatory variables (white circles in FIG. 3) included in the learning data belong. In the example shown in FIG. 3, the small regions in which the explanatory variable exists as the learning data are represented by shaded regions, and the small regions in which no explanatory variable exists as the learning data are represented by white regions. The generation unit 32 stores the generated map information in the model storage unit 20 (described later in detail) of the PLC 10.

Next, function configurations of the PLC 10 according to the embodiment are described.

As shown in FIG. 1, the PLC 10 includes an acquisition unit 12, a determination unit 14, an additional learning unit 16, and a control unit 18 as the function configurations. In addition, the model storage unit 20 is stored in a predetermined storage region of the PLC 10. As shown in FIG. 2, the CPU 42 reads the additional learning program stored in the storage device 46, and deploys and executes the additional learning program in the memory 44, and thereby each function configuration is achieved.

The acquisition unit 12 acquires the observation information from the manufacturing device 35. The acquisition unit 12 executes necessary processing such as extracting a feature value from the observation information, processes the observation information into the explanatory variable which is input to the model, and transfers the explanatory variable to the determination unit 14 and the control unit 18. When the observation information directly becomes the explanatory variable which is input to the model, the acquisition unit 12 directly transfers the observation information as the explanatory variable to the determination unit 14 and the control unit 18.

The determination unit 14 determines whether or not the explanatory variable transferred from the acquisition unit 12 is unknown in the model. Specifically, the determination unit 14 reads the map information from the model storage unit 20, and determines whether the explanatory variable transferred from the acquisition unit 12 belongs to the small regions in which the explanatory variable exists as the learning data or belongs to the regions in which no explanatory variable exists as the learning data. The determination unit 14 determines that the explanatory variable transferred from the acquisition unit 12 is known in the former case and unknown in the latter case, and a determination result is transferred to the additional learning unit 16.

When the explanatory variable is determined to be unknown by the determination unit 14, the additional learning unit 16 acquires the objective variable corresponding to the unknown explanatory variable, correlates the unknown explanatory variable and the acquired objective variable, and additionally learns the model.

The additional learning, also referred to as online learning, is processing in which a part of the model generated based on the initial or existing learning data is updated based on the newly obtained learning data. For example, additional learning data can be used to additionally learn the model by optimizing the parameters of the model with a stochastic gradient descent method or the like.

Figure 4:
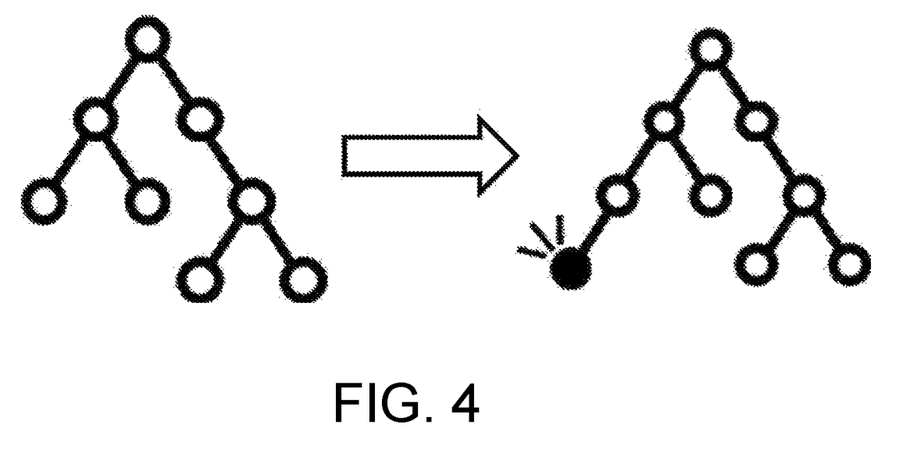
FIG. 4 is a diagram conceptually showing a state of additional learning of a model.

In FIG. 4, a state of the additional learning of the model is conceptually shown. As shown in FIG. 4, when the model is represented by a tree structure, a new node (a node shown by a black circle in FIG. 4) is added by the additional learning. In this way, when the explanatory variable is unknown, the objective variable corresponding to the explanatory variable is acquired and used as new learning data, and the model is updated by the additional learning. Therefore, an inference result obtained by the existing portion of the model does not change.

Figure 5:
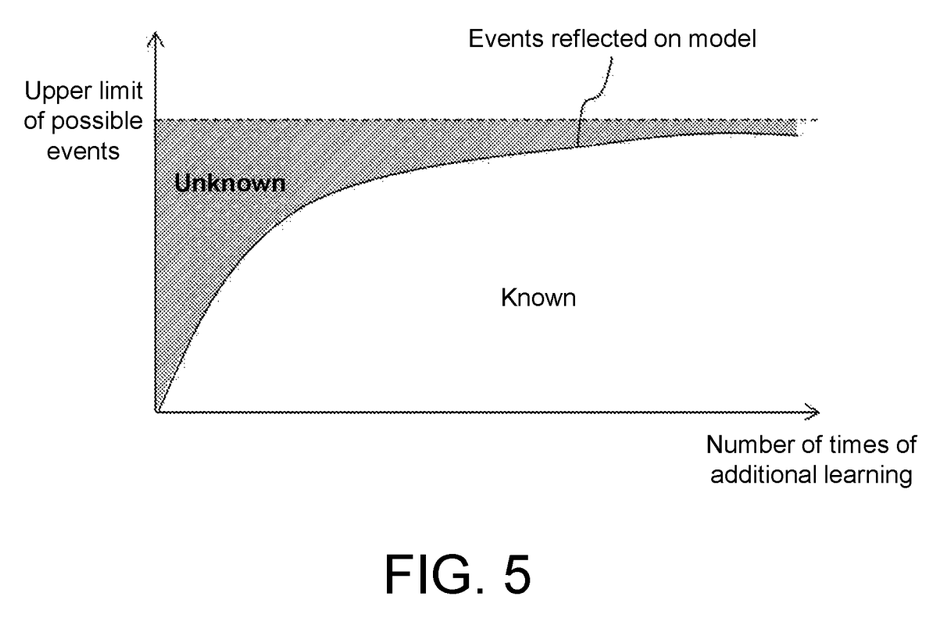
FIG. 5 is a diagram showing a relationship between the number of times of the additional learning and a proportion of events reflected on the model.

As shown in FIG. 5, the greater the number of times of additional learning, the higher the proportion of events reflected on the model which are events described by the known explanatory variable existing as the learning data, in all events described by the explanatory variable, that is, in an upper limit of possible events, and the higher the precision of inference performed by the model.

The additional learning unit 16 can acquire the objective variable corresponding to the unknown explanatory variable as follows.

The objective variable output from the model is set as the value in accordance with the observation information observed by the manufacturing device 35 after a predetermined time. In this case, the additional learning unit 16 acquires, as the objective variable corresponding to the unknown explanatory variable, the value in accordance with the observation information that is acquired after a predetermined time since the observation information corresponding to the unknown explanatory variable was acquired.

In addition, when the objective variable output from the model can be tentatively derived, the additional learning unit 16 sets a predetermined objective variable as the objective variable corresponding to the unknown explanatory variable. For example, the additional learning unit 16 can set, as the predetermined objective variable, a value that is obtained by linearly interpolating the value of the objective variable included in the learning data belonging to the small regions in which the explanatory variable is known among the small regions adjacent to the small regions to which the unknown explanatory variable belongs based on the map information. When the observation information, which is observed in the case that the manufacturing device 35 is controlled by an instruction in accordance with the output corresponding to the set objective variable, is the value within a prescribed range, the additional learning unit 16 acquires the set predetermined objective variable as the objective variable corresponding to the unknown explanatory variable.

In addition, the additional learning unit 16 may acquire the objective variable corresponding to the unknown explanatory variable by an input from a user.

The additional learning unit 16 stores the parameters of the model updated by the additional learning in the model storage unit 20. In addition, the additional learning unit 16 updates the map information based on the learning data represented by the pair of the explanatory variable and the objective variable used for the additional learning. Specifically, the additional learning unit 16 assigns the values showing that the explanatory variable exists as the learning data to the small regions in which no explanatory variable exists as the learning data.

The control unit 18 inputs the explanatory variable transferred from the acquisition unit 12 to the model, and generates and outputs a control signal for controlling the manufacturing device 35 based on the objective variable output from the model. For example, the control unit 18 generates the control signal for adjusting an angle of a roller or changing the rotation speed of the motor according to the state of the manufacturing device 35 predicted by the model.

Next, an action of the PLC 10 according to the embodiment is described.

Figure 6:
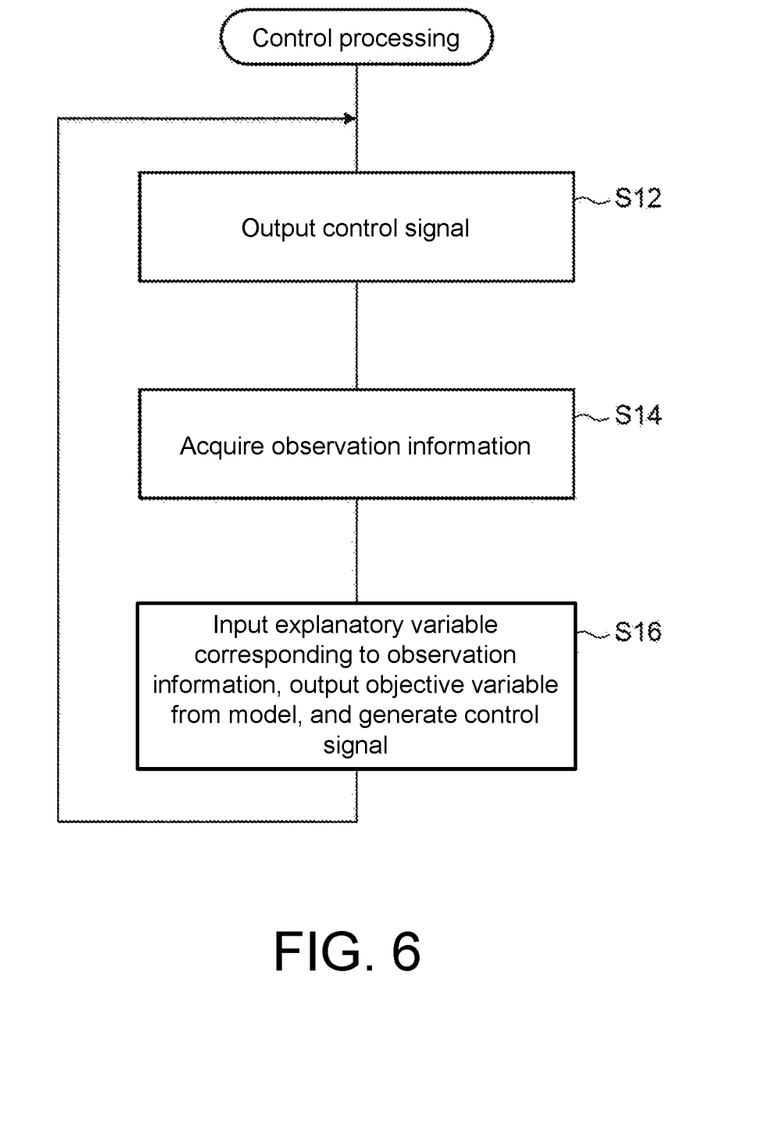
FIG. 6 is a flow chart showing a flow of control processing in the embodiment.

First, the control processing, which is processing for using the output of the model to control the manufacturing device 35, is described. FIG. 6 is a flow chart showing a flow of the control processing executed by the CPU 42 of the PLC 10. The CPU 42 reads a control program from the storage device 46, and deploys and executes the control program in the memory 44, and thereby the CPU 42 functions as each function configuration of the PLC 10, and repeatedly executes the control processing shown in FIG. 6.

In step S12, the control unit 18 generates and outputs the control signal for controlling the manufacturing device 35. Thereby, the manufacturing device 35 is controlled based on the control signal to operate. Along with the operations of the manufacturing device 35, the observation information is observed in the manufacturing device 35, and is output to the PLC 10.

Next, in step S14, the acquisition unit 12 acquires the observation information from the manufacturing device 35. Then, the acquisition unit 12 executes performs necessary processing on the observation information, processes the observation information into the explanatory variable which is input to the model, and transfers the explanatory variable to the determination unit 14 and the control unit 18. When the observation information directly becomes the explanatory variable which is input to the model, the acquisition unit 12 directly transfers the observation information as the explanatory variable to the determination unit 14 and the control unit 18.

Next, in step S16, the control unit 18 inputs the explanatory variable transferred from the acquisition unit 12 to the model, and generates the control signal for controlling the manufacturing device 35 based on the objective variable output from the model. Then, the processing returns to step S12.

Figure 7:
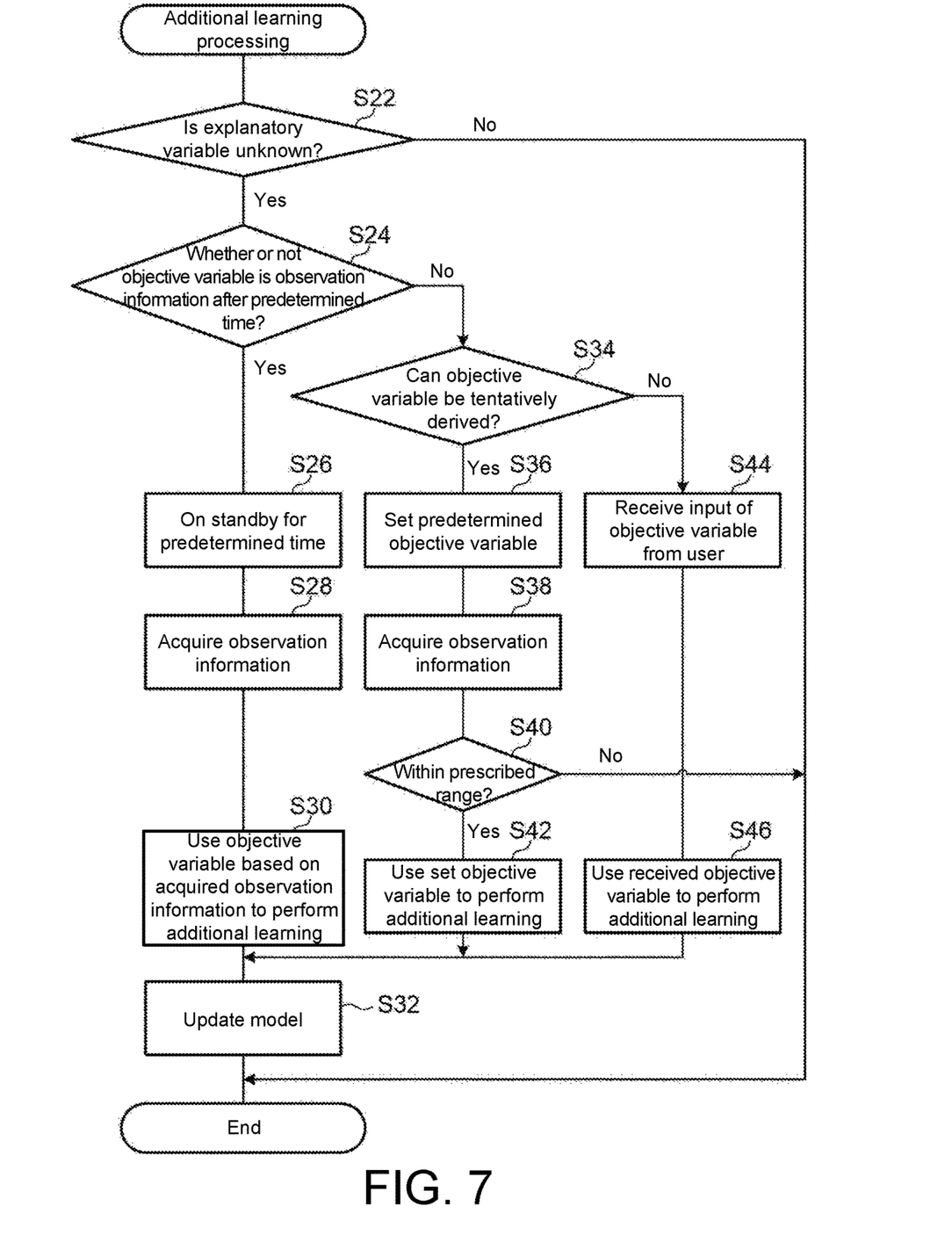
FIG. 7 is a flow chart showing a flow of additional learning processing in the embodiment.

Next, the additional learning processing in which the model is additionally learned is described. FIG. 7 is a flow chart showing a flow of the additional learning processing executed by the CPU 42 of the PLC 10. The CPU 42 reads the additional learning program from the storage device 46, and deploys and executes the additional learning program in the memory 44, and thereby the CPU 42 functions as each function configuration of the PLC 10, and executes the additional learning processing shown in FIG. 7. The additional learning processing is executed each time the observation information is acquired from the manufacturing device 35.

In step S22, the determination unit 14 receives the explanatory variable based on the observation information acquired by the acquisition unit 12 in step S14 of the control processing (FIG. 6). Then, the determination unit 14 reads the map information from the model storage unit 20, and determines whether or not the received explanatory variable belongs to the small regions in which no explanatory variable exists as the learning data in the map information. In the case of positive determination, the determination unit 14 determines that the received explanatory variable is unknown, and the processing transitions to step S24. In the case of negative determination, the received explanatory variable is known, and thus the additional learning processing is terminated without performing the additional learning of the model.

In step S24, the additional learning unit 16 determines whether or not the objective variable output from the model is the value in accordance with the observation information observed by the manufacturing device 35 after the predetermined time. In the case of positive determination, the processing transitions to step S26, and in the case of negative determination, the processing transitions to step S34.

In step S26, the acquisition unit 12 is on standby for a predetermined time, and acquires the observation information from the manufacturing device 35 in next step S28.

Next, in step S30, the additional learning unit 16 acquires the value in accordance with the observation information acquired in step S28 as the objective variable corresponding to the unknown explanatory variable. Then, the additional learning unit 16 correlates the unknown explanatory variable and the acquired objective variable, and additionally learns the model.

Next, in step S32, the additional learning unit 16 stores the parameters of the model updated by the additional learning in the model storage unit 20. In addition, the additional learning unit 16 updates the map information based on the learning data represented by the pair of the explanatory variable and the objective variable used for the additional learning. Then, the additional learning processing is terminated.

On the other hand, in step S34, the additional learning unit 16 determines whether or not the objective variable output from the model can be tentatively derived. When the objective variable can be derived, the processing transitions to step S36, and when the objective variable cannot be derived, the processing transitions to step S44.

In step S36, the additional learning unit 16 sets the predetermined objective variable as the objective variable corresponding to the unknown explanatory variable. Thereby, the control unit 18 generates and outputs the control signal in accordance with the set objective variable, and the manufacturing device 35 operates according to the control signal.

Next, in step S38, the acquisition unit 12 acquires the observation information from the manufacturing device 35 which operates according to the control signal in accordance with the set predetermined objective variable.

Next, in step S40, the additional learning unit 16 determines whether or not the observation information acquired in the step S38 is within the prescribed range. When the observation information is within the prescribed range, the processing transitions to step S42, and when the observation information is not within the prescribed range, the additional learning processing is terminated.

In step S42, the additional learning unit 16 acquires the predetermined objective variable which is set in step S36 as the objective variable corresponding to the unknown explanatory variable. Then, the additional learning unit 16 correlates the unknown explanatory variable and the acquired objective variable, additionally learns the model, and transitions to step S32.

In step S44, the additional learning unit 16 receives the input of the objective variable corresponding to the unknown explanatory variable from the user. Then, in next step S46, the additional learning unit 16 acquires the received objective variable as the objective variable corresponding to the unknown explanatory variable, additionally learns the model, and transitions to step S32.

As described above, according to the PLC of the embodiment, the observation information is acquired from the manufacturing device controlled by the instruction in accordance with the output from a previously learned model outputting the objective variable with respect to the explanatory variable. Then, when the explanatory variable corresponding to the acquired observation information is unknown in the model, the objective variable corresponding to the unknown explanatory variable is acquired, the unknown explanatory variable and the acquired objective variable are correlated, and the model is additionally learned.

Thereby, with regard to unknown disturbance events, the model can be updated in the PLC without stopping the device and requiring manpower. Consequently, compared to a case in which people make an update decision each time as described in the conventional technology, a time loss until the unknown events are reflected on the model can be reduced. Therefore, the yield is improved in a situation in which the manufacturing device is controlled by the PLC as described in the embodiment.

Moreover, an example in which the PLC is equipped with the additional learning device of the disclosure is described in the above embodiment, but the disclosure is not limited hereto. For example, the additional learning device of the disclosure can be applied to a function of autonomous driving or driving assistance of a vehicle. In this case, data such as a depression amount of an accelerator or a brake, a steering angle, a speed, an acceleration, and the like is acquired from the vehicle as the observation information, and a predicted value, which is obtained by the model inferring a state of the vehicle with the explanatory variable based on the observation information as an input, is output as the objective variable. Then, the control signal based on the objective variable may be output to the vehicle.

In addition, the additional learning processing executed by the CPU reading software (programs) in the above embodiment may be executed by various processors other than the CPU. The processors in this case include a programmable logic device (PLD) such as a field-programmable gate array (FPGA) that is capable of changing the circuit configuration after manufacturing, a dedicated electrical circuit such as an application specific integrated circuit (ASIC) that is a processor having a circuit configuration dedicated for executing specific processing, and the like. In addition, the additional learning processing may be executed by one type of the various processors, or may be executed by a combination of two or more processors of the same type or different types (for example, a plurality of FPGAs, a combination of the CPU and the FPGA, and the like). In addition, the hardware structure of these various processors is, more specifically, an electrical circuit which is obtained by combining circuit elements such as semiconductor elements.

In addition, in the above embodiment, an aspect in which the additional learning program is previously stored (installed) in the storage device is described, but the disclosure is not limited hereto. The program may be provided in a form of being stored in the storage medium such as the CD-ROM, the DVD-ROM, the Blu-ray disc, the USB memory, or the like. In addition, the program may have a form of being downloaded from an external device via a network.

What is claimed is:

1. An additional learning device, comprising one or more processors configured to:
    acquire observation information based on data observed in a manufacturing device that is controlled by an instruction in accordance with an output from a previously learned model outputting a first objective variable with respect to a first explanatory variable, wherein the first objective variable and the first explanatory variable are a pair of learning data used to train parameters of the previously learned model, wherein the observation information comprises a rotation speed of the motor of the manufacturing device;
    determine whether or not a second explanatory variable corresponding to the observation information is unknown in the previously learned model, wherein the second explanatory variable is a feature value extracted from the observation information and represents a current physical state of a motor of the manufacturing device;
    acquire a second objective variable corresponding to the second explanatory variable by interpolating values of the first objective variable included in the previously learning data in which values of the first explanatory variable corresponding to the values of the objective variable are known, correlate the second explanatory variable and the second objective variable, and retrain the parameters of the previously learned model with additional learn data including a pair of the second explanatory variable determined to be unknown and the second objective variable when the second explanatory variable is determined to be unknown to generate an updated learned model, wherein the first and second objective variables represent a predicted value of a future physical state of the motor of the manufacturing device;
    adjust the rotation speed the motor of the manufacturing device in accordance to the predicted value of the future physical state represented by the second objective variable generated by the updated learned model in response to the second explanatory variable that is not included in the learning data used to train the previously learned model.

2. The additional learning device according to claim 1, wherein the one or more processors hold map information showing, in an explanatory variable space of the previously learned model, a region in which the first explanatory variable exists as learning data when the previously learned model is learned and a region in which no explanatory variable exists as the learning data, and determines whether or not the second explanatory variable corresponding to the observation information is unknown based on which region the second explanatory variable corresponding to the information belongs to.

3. An additional learning method, comprising:
- acquiring observation information based on data observed in a manufacturing device that is controlled by an instruction in accordance with an output from a previously learned model outputting a first objective variable with respect to a first explanatory variable, wherein the first objective variable and the first explanatory variable are a pair of learning data used to train parameters of the previously learned model, wherein the observation information comprises a rotation speed of the motor of the manufacturing device,
- determining whether or not a second explanatory variable corresponding to the observation information is unknown in the previously learned model, wherein the second explanatory variable is a feature value extracted from the observation information and represents a current physical state of a motor of the manufacturing device,
- acquiring a second objective variable corresponding to the second explanatory variable by interpolating values of the first objective variable included in the previously learning data in which values of the first explanatory variable corresponding to the values of the objective variable are known, correlating the second explanatory variable and the second objective variable, and retrain the parameters of the previously learned model with additional learn data including a pair of the second explanatory variable determined to be unknown and the second objective variable when the second explanatory variable is determined to be unknown to generate an updated learned model, wherein the first and second objective variables represent a predicted value of a future physical state of the motor of the manufacturing device,
- adjusting the rotation speed the motor of the manufacturing device in accordance to the predicted value of the future physical state represented by the second objective variable generated by the updated learned model in response to the second explanatory variable that is not included in the learning data used to train the previously learned model.

4. A non-transitory computer readable storage medium, storing an additional learning program for making a computer to:
- acquire observation information based on data observed in a manufacturing device that is controlled by an instruction in accordance with an output from a previously learned model outputting a first objective variable with respect to a first explanatory variable, wherein the first objective variable and the first explanatory variable are a pair of learning data used to train parameters of the previously learned model, wherein the observation information comprises a rotation speed of the motor of the manufacturing device;
- determine whether or not a second explanatory variable corresponding to the observation information is unknown in the previously learned model, wherein the second explanatory variable is a feature value extracted from the observation information and represents a current physical state of a motor of the manufacturing device;
- acquire a second objective variable corresponding to the second explanatory variable by interpolating values of the first objective variable included in the previously learning data in which values of the first explanatory variable corresponding to the values of the objective variable are known, correlate the second explanatory variable and the objective variable, and retrain the parameters of the previously learned model with additional learn data including a pair of the second explanatory variable determined to be unknown and the second objective variable when the second explanatory variable is determined to be unknown to generate an updated model, wherein the first and second objective variables represent a predicted value of a future physical state of the motor of the manufacturing device;
- adjust the rotation speed the motor of the manufacturing device in accordance to the predicted value of the future physical state represented by the second objective variable generated by the updated learned model in response to the second explanatory variable that is not included in the learning data used to train the previously learned model.

* * * * *